United States Patent Office 3,341,301
Patented Sept. 12, 1967

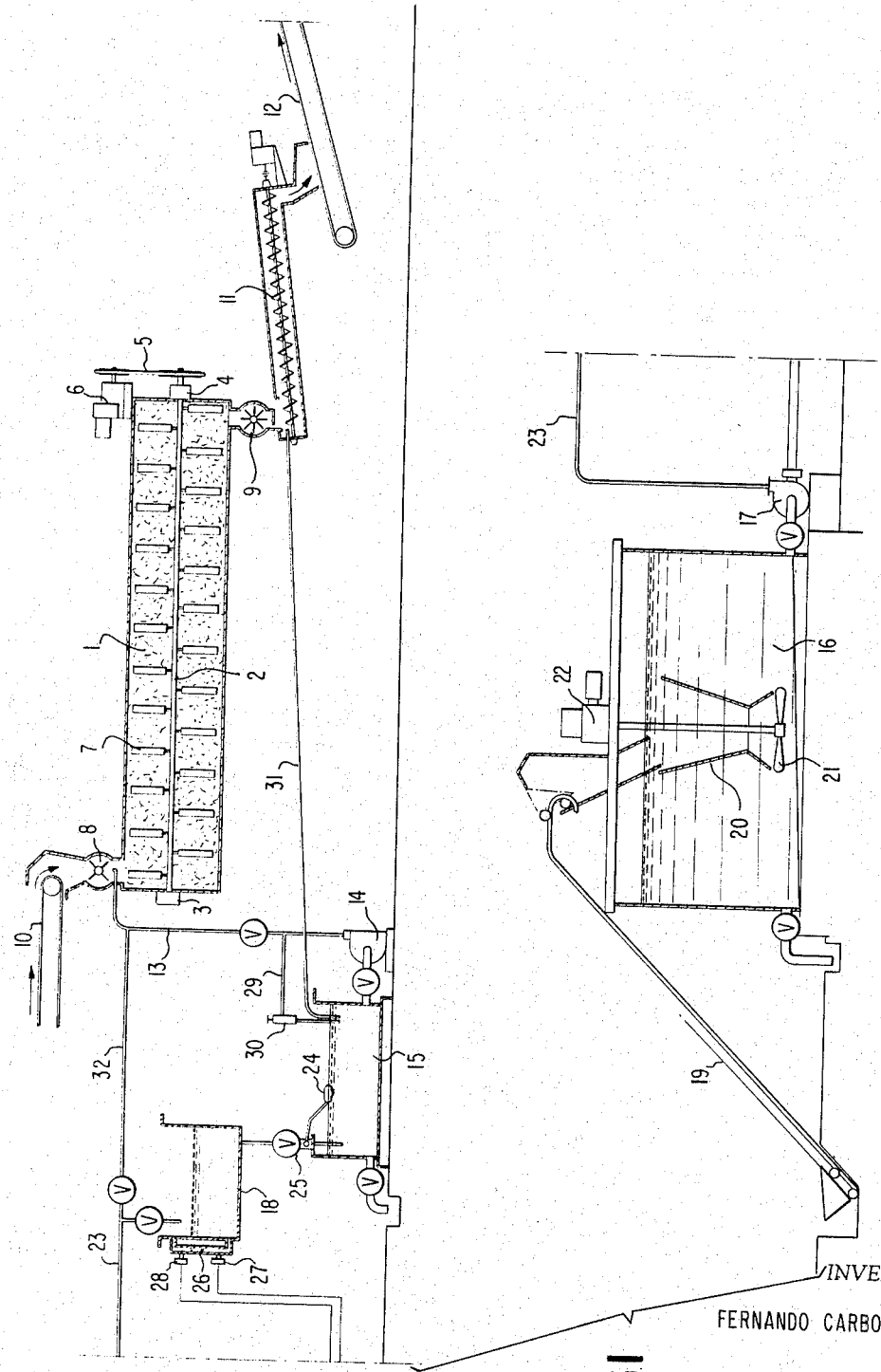

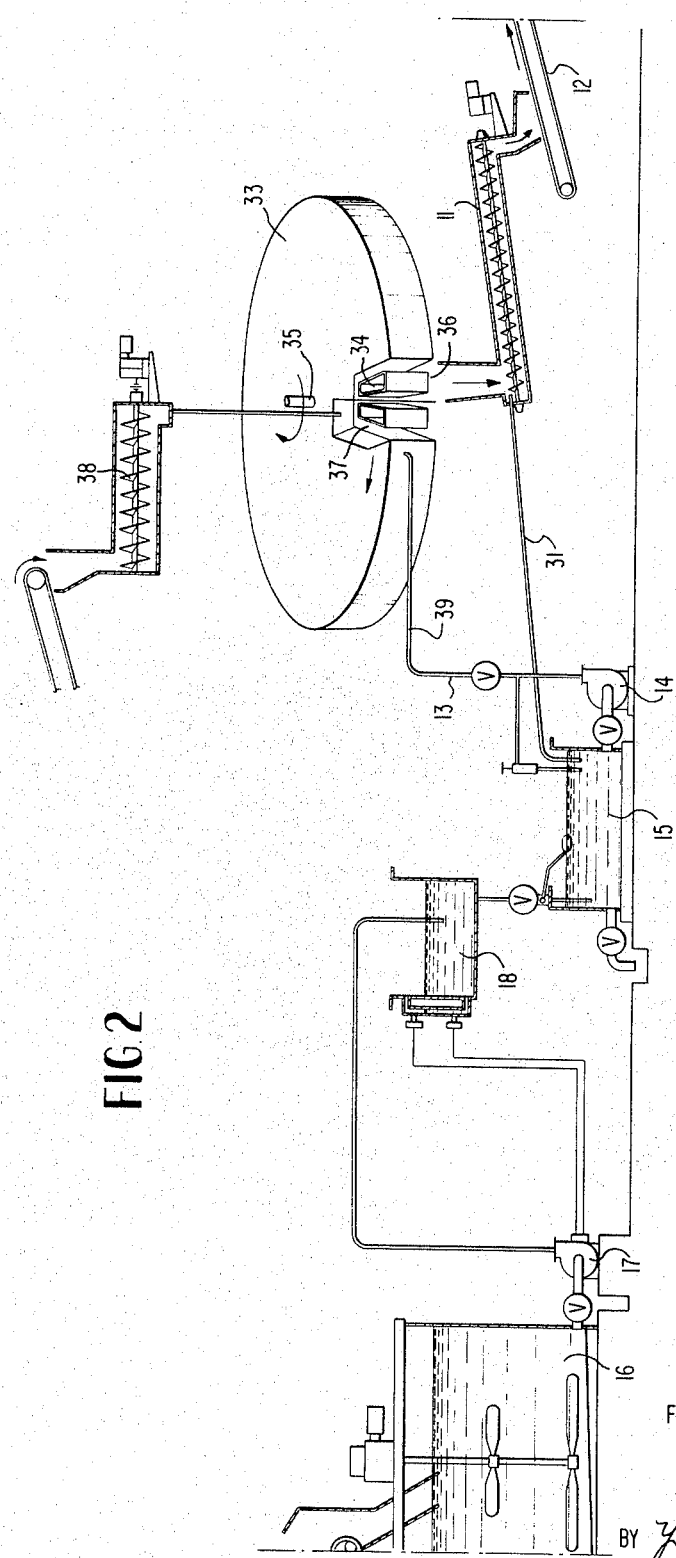

3,341,301
APPARATUS FOR THE CONTINUOUS PRODUCTION OF ARTIFICIAL FERTILIZERS
Fernando Carbona, 9 Rue Galilee, Paris 8, France
Filed Feb. 3, 1964, Ser. No. 341,956
Claims priority, application France, Feb. 7, 1963, 923,991
3 Claims. (Cl. 23—259.1)

In order to fabricate artificial fertilizer, it has already been suggested to impregnate straw and vegetable waste products with a solution of nitrogenous matter containing certain microorganisms. The impregnated matter is then placed in a fermentation area and is transformed spontaneously into fertilizer which is ready for use. According to the prior art procedures, the material to be transformed, in particular straw in the form of pressed bales, is subjected to impregnation by being passed into an enclosure where it receives the treating solution under pressure. This procedure is a batch process, comprising the successive operations of the introduction of the bales of straw into the receiving container under pressure, the introduction of impregnating fluid, evacuation of residual liquid, the removal of the impregnated bales, and their piling into the fermentation area.

This procedure, although it may be applied without serious difficulty to pressed bales of straw which readily lend themselves to handling, proves more difficult to employ with other materials, such as vegetable waste products or loose straw.

According to the present invention, the material to be treated is introduced by a conveyor into a closed region where it undergoes a continuous movement and is placed in permanent contact with a circulating mass of treating solution.

The region in which the continuous treatment takes place can be a cylindrical vat having its axis horizontal and provided with an Archimedean screw or blades which function as agitators and, at the same time, ensure the progressive movement of the material to be treated.

According to another embodiment, the treatment enclosure is a cylindrical container having a vertically disposed axis, in which is mounted a rotating assembly of bottomless buckets. The buckets receive loads of raw material which they maintain in rotation in order to retain the raw material in contact with the treating solution for the required length of time.

In each case, the treating solution is introduced into the container by a pump which places it under the required pressure. The excess solution returns to the pump well.

The feeding of vegetable matter to be treated as well as its evacuation is assured in a continuous fashion for all commonly used types of conveyors.

The attached drawings represent, by way of example, two procedures for carrying out the continuous method according to the present invention.

FIGURE 1 is a partially schematic elevational view of an installation comprising a horizontal cylindrical container having moving blades.

FIGURE 2 is a partially schematic elevational view of an installation comprising a vertical cylindrical container utilizing buckets.

The installation shown in FIG. 1 is composed essentially of a horizontal cylindrical reservoir 1 having walls which are sufficiently thick to withstand a pressure of 3 to 5 atmospheres.

The container carries, along its axis, a shaft 2 mounted on bearings 3 and 4 driven by a drive chain 5, or by some other means, the chain being driven by motor 6. The shaft 2 carries an assembly of spaced blades 7. These blades can be rotated around their vertical axes to some desired angle by an appropriate mechanism, the amount of cant being determined by the demands of the installation. The container 1 is provided at 8 with a rotating distributor for the introduction of material to be treated and at 9 with a rotating discharge device.

The distributor 8 can be fed by any appropriate means such as an endless conveyor belt 10. An inclined conveyor screw 11 receives material from discharge device 9, followed by an endless conveyor belt 12.

The treating container 1 is fed with a treating solution under pressure by conduit 13 opening in the region where the material to be treated is admitted, below the distributor 8. The treating solution, which is temporarily stored in the tank or storage vessel 15, is pumped through the conduit 13 by the pump 14. This tank 15 is itself fed by the intermediate container 18, the latter receiving the treating solution from conduit 23, the solution being pumped through this conduit by pump 17 after having been prepared in vat or make-up vessel 16.

The vat 16 receives water and the materials which are to be dissolved therein to form the artificial liquid animal waste which will serve as the treating solution in container 1.

The substances to be dissolved, nitrogenous materials such as urea, ammonium salts, amine compounds, etc., with any suitable amounts of additives or fillers, sugar or other soluble carbohydrates, mineral salts, etc. are conveyed to the vat by transporter 19. They are dumped into a passage 20 arranged in the center of the vat, at the bottom of which is placed an agitator 21. The passage is advantageously formed in the shape of a convergence-divergence. The agitator 21 is driven by a motor 22.

With this arrangement there is assured, with the aid of suitable agitation, a circulation of the liquid in the vat which produces the desired dissolution of the materials introduced. It is thus a liquid having a uniform desired composition which is drawn in by the pump 17 in order to be sent to the treating container, through the intermediary of the container 18 and the tank 15, by means of the piping 23.

The tank 15 has a level regulating float 24 controlling the output flow valve 25 of container 18. The container 18 is optional and serves as a "buffer" between vat 16 and tank 15. The container 18 is provided with a level gauge 26 in which are arranged contacts 27 and 28 which are responsive to the presence or absence of liquid in their vicinity and which function to automatically start or stop the pump 17.

The output 13 from pump 14 carries with it a tapoff, or "bleeder" 29 connected to a safety valve 30. The conveyor screw 11 is connected to the tank 15 by piping 31. A by-pass 32 may also be provided between the piping 23 and the input piping 13 for the container 1.

In this installation, the material to be treated, such as chopped straw, vegetable waste, etc. is introduced into the container 1 in a continuous fashion. It can proceed in this way because of the nature and operation of blades 7 and it is removed from the container in a manner which is also continuous and is conveyed away by conveyors 11 and 12. During the time that it remains in the container 1, the material to be treated is placed in permanent contact with the artificial liquid waste which has been introduced under pressure by the piping 13. This liquid impregnates the material and the excess liquid, after the evacuation of the treated material at 9, returns to the tank 15 through conduit 31, thus returning to the liquid input circuit. The flow of liquid from vat 16 is regulated automatically, through container 18, in order to compensate for the liquid retained by the treated material.

In a second embodiment of the continuous treatment installation (FIG. 2), the treating apparatus is composed of a cylindrical enclosure 33 having a vertical axis and sealed by two horizontal bases. Within this enclosure are disposed bottomless containers, or buckets 34 forming a continuous annular series about an axis of rotation 35. The buckets constitute a series of pockets having neither tops nor bottoms. During their rotating movement, they pass successively over an evacuation orifice 36, then over the lower base of enclosure 33 and under an inlet orifice 37 arranged in the upper base of the enclosure.

The orifice 37 is connected by an appropriate conduit to the output of a conveyor of the screw-type, or any other similar type, 38. The evacuation orifice is arranged so as to be in communication with a screw-type evacuation conveyor 11.

The enclosure 33 receives, by means of piping 39, the artificial waste treating liquid which has been prepared by means which are identical with those described in connection with FIG. 1, these means comprising tank 15, vat 16, and pumps 14 and 17.

The excess liquid in conveyor 11 returns to tank 15 through piping 31.

The material to be treated, chopped straw, cellulose waste, etc., delivered by 38 into the bucket 34 which is in front of opening 37, is conveyed by this bucket and makes one complete revolution around the enclosure until arriving opposite orifice 36. During this rotation, the material which is contained by the bucket and the lower base of enclosure 33, is subjected to the action of the liquid which has been delivered through piping 39 and retained under pressure in the enclosure 33, and is impregnated therewith. It is thus a material laden with artificial animal waste which flows through 36 when the bucket 34 is positioned before this opening and which is collected by the conveyor 11 in order to be sent to the fermentation area. Although the feeding and evacuation of the enclosure are effected by successive individual loads, they are sufficiently close together to constitute a continuous treating process for the production of artificial fertilizer.

The specific embodiments shown and described above are only intended to serve as examples of a few of the forms which this invention may take. Many modifications can be made without departing from the spirit of the present invention the scope of which is intended to be limited only by the breadth of the appended claims.

What I claim is:

1. Apparatus for the continuous production of artificial fertilizer from vegetable material, comprising a pressure vessel, a sealed inlet for raw vegetable material, means for feeding raw vegetable material to said inlet, a sealed outlet for treated vegetable material, means for removing treated vegetable material from said outlet, means for moving vegetable material through the pressure vessel from said inlet to said outlet, means for feeding a nitrogenous aqueous solution to said pressure vessel adjacent said inlet and for maintaining the interior of said pressure vessel under superatmospheric pressure, means for removing spent solution from said pressure vessel adjacent said outlet, said nitrogenous solution moving generally cocurrently with the vegetable material through the pressure vessel to impregnate the vegetable material with nitrogenous compounds, a storage vessel, means for conducting said spent solution to said storage vessel, a make-up vessel for fresh solution, means for introducing water-soluble nitrogenous compounds and water into said make-up vessel, agitator means in said make-up vessel for promoting the dissolution of said nitrogenous compounds, means for conducting fresh solution from said make-up vessel to said storage vessel, and means for conducting nitrogenous solution from said storage vessel to said means for feeding nitrogenous solution to said pressure vessel.

2. Apparatus as claimed in claim 1, said pressure vessel being cylindrical and having a horizontal axis, and said means for moving vegetable material through said pressure vessel comprising a rotating shaft disposed within and coaxial with said vessel and carrying inclined agitating conveyor blades.

3. Apparatus as claimed in claim 1, said pressure vessel comprising a cylindrical pressure vessel with a vertical axis, said means for moving vegetable material through the pressure vessel comprising an upright shaft rotatable within and coaxial with said vessel, a plurality of open-bottomed buckets carried by and rotatable with said shaft and said vessel, said inlet being disposed above said buckets and said outlet being disposed below said buckets, said outlet being adjacent said inlet in a direction opposite the direction of rotation of said buckets.

References Cited

UNITED STATES PATENTS

| 3,131,202 | 4/1964 | Depmer | 23—269 X |
| 3,172,752 | 3/1965 | Pierce | 23—259.1 X |
| 3,197,300 | 7/1965 | Tomioka | 71—24 |

FOREIGN PATENTS 166,037   5/1950   Austria.

JAMES H. TAYMAN, JR., *Primary Examiner.*

MORRIS O. WOLK, *Assistant Examiner.*